United States Patent
Joshi et al.

(10) Patent No.: US 8,407,506 B2
(45) Date of Patent: Mar. 26, 2013

(54) DYNAMIC ALLOCATION OF PROCESSOR CORES RUNNING AN OPERATING SYSTEM

(75) Inventors: Narendra Joshi, Lake Grove, NY (US); Russell E. Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 208 days.

(21) Appl. No.: 13/076,353

(22) Filed: Mar. 30, 2011

(65) Prior Publication Data

US 2012/0254647 A1  Oct. 4, 2012

(51) Int. Cl.
  *G06F 1/26* (2006.01)
(52) U.S. Cl. .................................. 713/324; 713/320
(58) Field of Classification Search .................. 710/260; 713/320, 324
See application file for complete search history.

(56) References Cited

U.S. PATENT DOCUMENTS

| | | | | |
|---|---|---|---|---|
| 2012/0166764 A1* | 6/2012 | Henry et al. | ...................... | 712/43 |
| 2012/0192194 A1* | 7/2012 | Richardson | ................... | 718/103 |

FOREIGN PATENT DOCUMENTS

GB  2421325 A  6/2006

OTHER PUBLICATIONS

International Search Report and Written Opinion for counterpart International Patent Application No. PCT/US2012/028678 mailed on Jun. 8, 2012.
Intel—Techniques for Lowering Power Consumption in Design Utilizing the Intel EP80579 Integrated Processor Product Line—Application note—Feb. 2010—11 pages.

* cited by examiner

*Primary Examiner* — Albert Wang
(74) *Attorney, Agent, or Firm* — Brian M. Mancini

(57) ABSTRACT

An apparatus and method for dynamic allocation of multiple processor cores in a computer running an operating system includes providing a program operable to halt a core from processing instructions from a respective ready queue. A next step includes establishing a maximum count of tokens available to allow the program execution, wherein the maximum count is less than a total number of cores. A next step includes obtaining tokens by the cores, wherein at least one core will not be able to obtain a token. If a token has been obtained by a core, executing the program by that core, or otherwise not executing the program by that core and remaining active to process instructions from the respective ready queue of that core.

16 Claims, 3 Drawing Sheets

-- PRIOR ART --

DYNAMIC ALLOCATION OF PROCESSOR CORES RUNNING AN OPERATING SYSTEM

FIELD OF THE DISCLOSURE

The present invention relates generally to multi-core computer processors and more particularly to dynamic allocation of processor cores running an operating system.

BACKGROUND

Presently, there exist multi-core processor machines that have multiple cores servicing an operating system (OS) such as the Microsoft® Windows® 7 operating system for example. Such machines utilize an increased amount of power for each processor core that is running, which can be a disadvantage for those machines that operate under battery power, such as mobile devices. It would be beneficial, power-wise, to idle as many of the cores as possible, when certain power management conditions exist, perhaps temporarily during periods of stress.

However, an operating system (OS) such as the Microsoft® Windows® 7 does not support an increase/decrease in the number of active cores in its processor while operating. The reason the Microsoft® Windows® 7 OS does not support such "hot core" re-allocating is because the OS allocates resources and makes critical assumptions based on the cores present at boot time. The Microsoft® Windows® 7 OS does allow unused cores to be parked or disused, effectively shutting them off, but this is done only as a result of the OS' perception of loading, wherein a light loading condition, the OS can load balance and park cores.

One solution to the problem can be to use hypervisor software running between the OS and the processor hardware to present a virtual set of cores to the OS. In effect, the hypervisor software creates a false image of multiple cores to the OS, which leads the OS to believe it has multiple active cores, whereas the hardware actually may have less than all cores active. Unfortunately, hypervisor software is large, requiring a substantial amount of hypervisor code footprint and the need of virtualization support within processors to achieve a reasonable performance outcome. Moreover, there is a performance penalty introduced by the hypervisor software.

Another solution is "core parking" achieved using process affinity, wherein OS processes are physically assigned to one core, effectively parking any non-used cores. However, this is not a guaranteed technique since it is controlled by the OS, and is again a workload dependant function as perceived by the OS.

Accordingly, there is a need to rapidly reduce or increase the active cores that are servicing the operating system for power reasons, and to do so without regard to process loading in near real time. Further, it would be of benefit to dynamically allocate the active cores without rebooting the OS.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
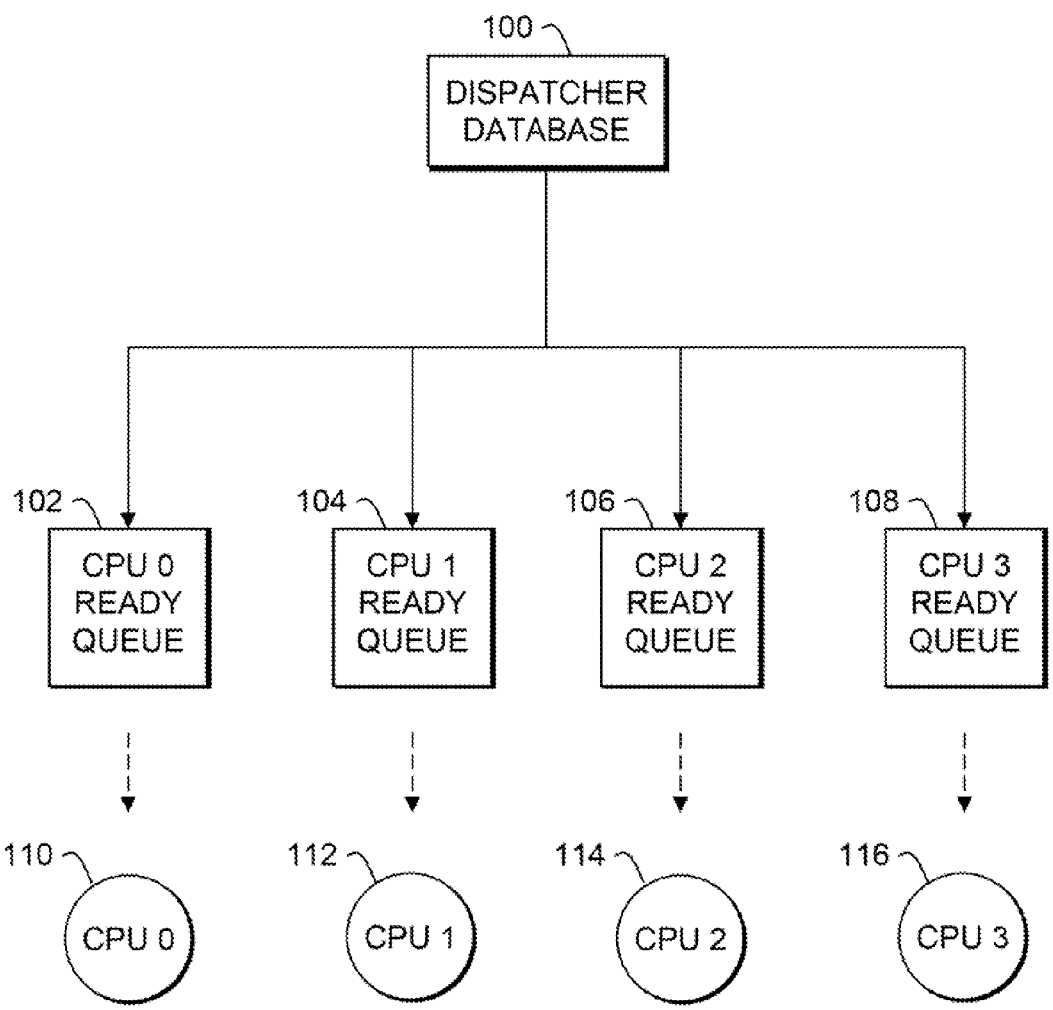
FIG. 1 is a simplified block diagram of a prior art multi-core processor.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel technique to simply reduce or increase the active cores that are servicing the operating system for power reasons. This is done without modification to, or support of the operating system (OS). This is accomplished using a hardware arrangement involving no changes to the operating system, and it can be implemented as an application with driver calls. Advantageously, the present invention can rapidly reduce power drain by dynamically allocating the active cores without rebooting the OS and without regard to process loading.

FIG. 1 is a block diagram of a prior art multi-core processor, such as can be used by the Microsoft® Windows® 7 OS for example. A four-core processor example is shown with cores CPU 0 110, CPU 1 112, CPU 2 114 and CPU 3 116. A dispatcher database 100 is a workload repository controlled by the OS. The database 100 holds processes and threads to be serviced by the cores. The OS directs the database 100 to distribute its processes and threads to a ready queue for each core. For example, core CPU 0 110 has its CPU 0 ready queue that holds the processes and threads distributed by the database 100 to be serviced by CPU 0 110. Similarly, core CPU 1 112 has its CPU 1 ready queue that holds the processes and threads distributed by the database 100 to be serviced by CPU 1 112, core CPU 2 114 has its CPU 2 ready queue that holds the processes and threads distributed by the database 100 to be serviced by CPU 2 114, and core CPU 3 116 has its CPU 3 ready queue that holds the processes and threads distributed by the database 100 to be serviced by CPU 3 116. The distribution by the database 100 is performed in accordance with fairness rules such that each core will share the processing load approximately equally over time, assuming other considerations such as load balancing core parking rules are not in affect.

Figure 2:
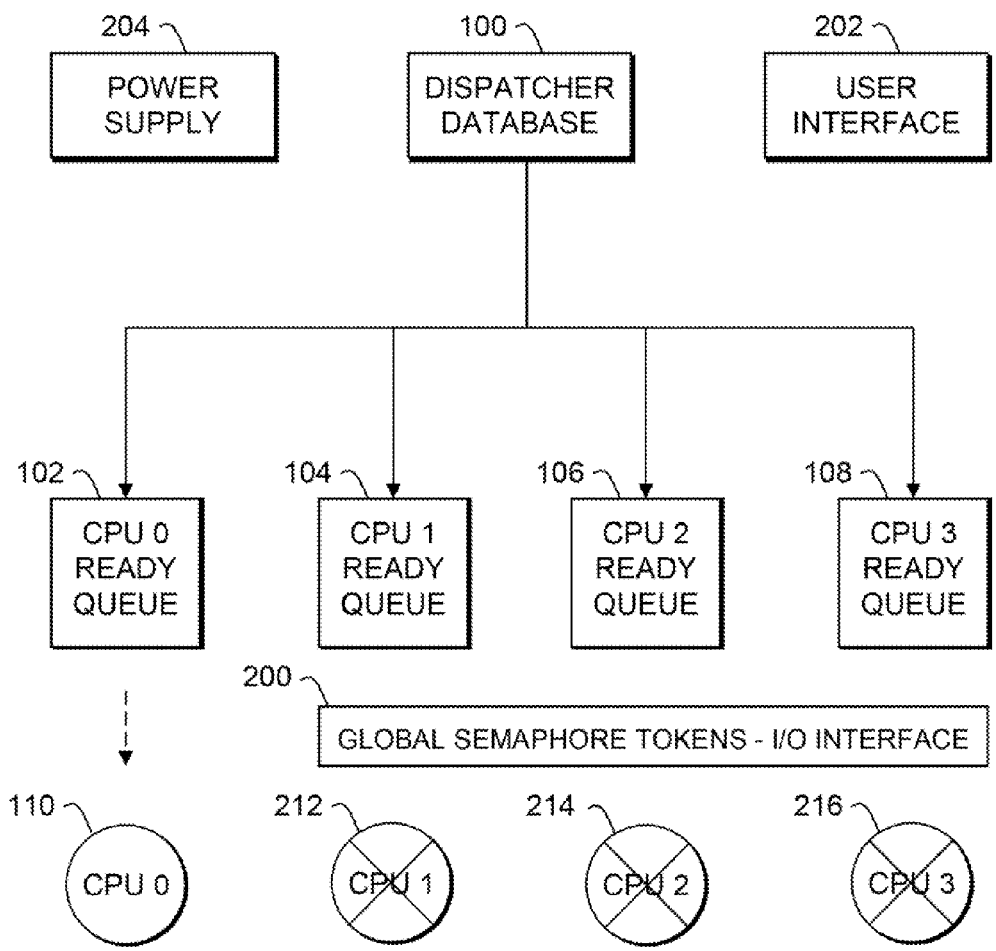
FIG. 2 is a simplified block diagram of dynamic allocation of active cores, in accordance with the present invention.

FIG. 2 is a block diagram of a multi-core processor of a computer, in accordance with the present invention. The processors and cores as depicted in FIG. 2 can comprise basic components such as, but not limited to, microprocessors, digital signal processors (DSPs), microcontrollers, memory devices, application-specific integrated circuits, and/or logic circuitry. The computer can be a mobile computing device with power limitations. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Therefore, the processor of FIG. 2 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the aspects of the present invention may be implemented in any of the devices listed above or distributed across such components. For the purposes of the present invention, the terms processor core, core, and central processing unit (CPU) are equivalent.

Referring back to FIG. 2, the present invention introduces a dynamic technique to halt the use of all but one cores of the processor of a computer, leaving the one core as the only active core. In other embodiments, more than one core can be left active. The halting of cores is done for power reasons, without modification to, or support of the OS. This is accomplished using a hardware arrangement involving no changes to the operating system, and it can be implemented as an application with driver calls. There is no rebooting of the OS required and core halting is performed without regard to the OS's perception of the workload. Although the present invention is described herein with specific application to a Microsoft® Windows® 7 OS, it should be recognized that the present invention is also applicable to other types of multi-core processor systems.

The present invention utilizes the same dispatcher database 100 CPU ready queues 102, 104, 106, 108, and cores as in FIG. 1. However, the present invention introduces a hardware arrangement 200 that connects to one of the I/O interfaces of the computer, such as the GPIO (General Purpose Input Output) for example. The hardware arrangement can be embodied as a peripheral device connected externally, or even internally, with a computer I/O interface. The hardware arrangement can connect to the interface address bus, and introduce a global semaphore accessible via the address bus by each core. The global semaphore provides a token for the cores to execute a CoreHalt program, in accordance with the present invention. As is known in the art, core operation is interrupted every quantum clock cycle (i.e. 100 milliseconds). At this interruption, each core will in running the CoreHalt program, attempt to obtain a token from the global semaphore. There is a maximum count (e.g. total number of cores minus one) of tokens available for the cores. In one embodiment for example, all but one of the cores can obtain a token. Any core that obtains a token will execute the CoreHalt program's halt assembler statement The CoreHalt program contains assembly instructions to halt the core processing of instructions from a ready queue of that core. There will be one such CoreHalt program for every physical core. The CoreHalt program would typically be implemented within a device driver so that the device possesses the necessary privilege levels. In the example herein, the global semaphore will allow three CoreHalt programs to execute at each of their respective cores (212, 214, 216 of FIG. 2). The fourth core 110 which has not obtained the token waits for the global semaphore to provide it a token and this wait causes the core to execute workload in its ready queue. The CoreHalt programs that are executed on their respective cores 212, 214, 216 will halt those cores from processing their respective ready queues 104, 106, 108. In practice, the CoreHalt programs will cause the cores to execute a assembler halt command until the next quantum clock cycle interruption occurs, effectively idling those cores so that they only use quiescent power. The CoreHalt program that was blocked from being executed by its respective core 110 will cause that core to remain active to process the workload in its ready queue 102. The remaining three CoreHalt programs that are allowed to execute by the semaphore, will execute halt instructions for their respective cores 212, 214, 216, which will then not participate in any workload execution.

In effect, the present invention reduces power consumption from a power supply 204 (e.g. battery) of a computer to approximately 25% normal, regardless of to process loading in the database or ready queues, and without any modification to, or support of the OS. This power reduction occurs as a consequence of the halted cores consuming quiescent power, and also because the system is executing a lower rate of instructions per time, which would reduce the load on other components like memory and peripheral components. Of course, it should be recognized that the maximum count of tokens could be changed to allow approximately 50%, 75% or even 100% active cores during each cycle. In the 25% embodiment, after each interruption at the quantum clock cycle, each core will again attempt to obtain a semaphore token, with one core unable to do so once the maximum count of tokens is reached. As each core has an equal chance of obtaining a token in any one cycle, all of the cores will have the opportunity to process their ready queues equally over time.

Each CoreHalt program can be assigned to its particular core using affinity, wherein OS processes are physically assigned to a particular core. The CoreHalt program can then by provisioned in the Microsoft® Windows® 7 OS to raise it to the highest available priority in that operating system over other programs and drivers. As a result, the execution of the CoreHalt program operates in near real time and mitigates any conflicts with other programs and drivers.

It is envisioned that the operation and monitoring of the present invention could be user-activated or hardware activated on a computer, by placing a core allocation, power saving function of the present invention on the computer that can be toggled by a user through activation of an icon, button or other function on a user interface 202 of the computer. It is also envisioned that the computer can provide a display on the user interface 202 to the user indicating that the core allocation, power saving function is either in operation or not, or a power savings that is being achieved. It is also envisioned that a user could control the maximum count of available tokens through activation of an icon, button or other function on the user interface 202 of the computer, and thereby effect the amount of power savings available using the present invention.

The user activation/deactivation can come about as a result of a software call which instructs the CoreHalt program to engage/disengage the global semaphore and the subsequent halt instructions. A hardware activation/deactivation can also come about as a result of a hardware signal to the global semaphore hardware that results in the semaphore operation being activated or deactivated, or activated with varying token behavior—e.g. allowing two cores to halt out of four, three cores to halt out of four, etc. It is also envisioned that a temporary power stress situation can be alleviated using the present invention. For example, in a dock-to-undock scenario where the system transitions from a wall power source to battery source, it is envisioned that the present invention can reduce power draw and allow the system to shutdown normally (on one core). Further, this invention can work in conjunction with existing available methods of core throttling.

Figure 3:
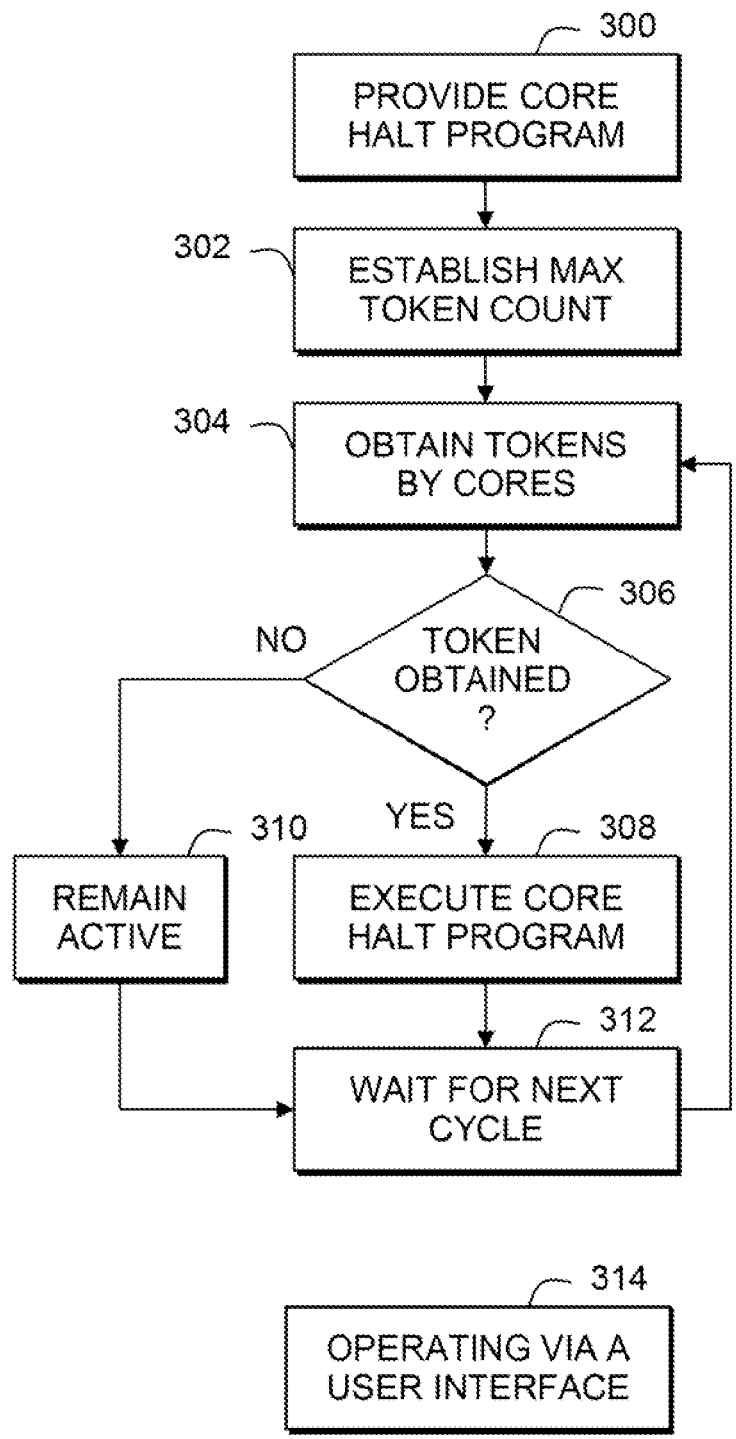
FIG. 3 is a simplified block diagram of a method, in accordance with a further embodiment of the present invention.

FIG. 3 illustrates a flowchart of a method for dynamic allocation of multiple processor cores running an operating system, in accordance with the present invention.

The method starts by providing 300 a program operable to halt a core of a processor from processing instructions from a respective ready queue.

A next step includes establishing 302 a maximum count of tokens available to allow execution of the program, wherein the maximum count is less than a total number of cores in the processor.

A next step includes obtaining 304 tokens by the cores, wherein at least one core will not be able to obtain a token.

If a token has been obtained by a core 306, a next step includes executing 308 the program by that core to halt the processing of the respective ready queue of that core. If a token has not been obtained by a core 306, that core without a token will not be able to execute the program, thereby remaining active 310 to process instructions from its respective ready queue.

In either case, a next step includes waiting 312 a predefined amount of time, i.e. for the next quantum clock cycle.

After the time expires, i.e. an interrupt is generated, and the process returns to obtaining 304 tokens by the cores to see which of the cores will remain active for the next cycle.

Preferably, it is envisioned that the above method would be operated 314 and monitored by a user of the computer via a user interface of the computer.

Advantageously, the present invention enable forced core parking in a Microsoft® Windows® 7 OS that does not support forced core parking, which is the case for desktop windows operating systems today. The present invention is relatively simple to implement, involves no changes to the operating system, and can be implemented as an application with driver calls.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for dynamic allocation of multiple processor cores in a computer running an operating system, the method comprising the steps of:

providing a program operable to halt a core from processing instructions from a respective ready queue;

establishing a maximum count of tokens available to allow execution of the program, wherein the maximum count is less than a total number of cores; and obtaining tokens by the cores, wherein at least one core will not be able to obtain a token;

wherein if a token has been obtained by a core, executing the program by that core to halt the processing of the respective ready queue of that core, and wherein if a token has not been obtained by a core, not executing the program by that core and remaining active to process instructions from the respective ready queue of that core.

2. The method of claim 1, further comprising:
waiting a predefined amount of time; and
returning to the obtaining step.

3. The method of claim 2, wherein the amount of time is a quantum clock cycle of a computer comprising the cores.

4. The method of claim 1, wherein establishing includes the tokens provided in a global semaphore on an address bus supplied by a peripheral device connected to an input/output interface.

5. The method of claim 1, wherein the providing step provides a program for each core.

6. The method of claim 1, wherein the providing step provisions the program to have the highest available priority in that operating system.

7. The method of claim 1, further comprising operating the method by a user via a user interface of the computer.

8. The method of claim 1, wherein the operating system is a Microsoft® Windows® 7 operating system.

9. A computer operable to dynamically allocate multiple processor cores running an operating system, the computer comprising:

a program operable to halt a core from processing instructions from a respective ready queue; and a peripheral device operable to provide tokens available to allow execution of the program, wherein the tokens have a maximum count is less than a total number of cores;

wherein the cores are operable to attempt to obtain tokens, and wherein at least one core will not be able to obtain a token;

wherein if a token has been obtained by a core, executing the program by that core to halt the processing of the respective ready queue of that core, and wherein if a token has not been obtained by a core, not executing the program by that core and remaining active to process instructions from the respective ready queue of that core.

10. The computer of claim 9, wherein the cores are operable to wait a predefined amount of time and again attempt to obtain tokens.

11. The computer of claim 9, wherein the amount of time is a quantum clock cycle of a computer comprising the cores.

12. The computer of claim 9, wherein the tokens are provided in a global semaphore on an address bus supplied by the peripheral device connected to an input/output interface of the computer.

13. The computer of claim 9, wherein a program is provided for each core.

14. The computer of claim 9, wherein the programs are provisioned to have the highest available priority in that operating system.

15. The computer of claim 9, further comprising a user interface wherein a user can operate functionality of the program and tokens via the user interface.

16. The computer of claim 9, wherein the operating system is a Microsoft® Windows® 7 operating system.

* * * * *